United States Patent [19]
Eichelberger et al.

[11] 3,895,525
[45] July 22, 1975

[54] ACOUSTIC IMAGING APPARATUS FOR VISUAL DISPLAY WITH DEPTH PERCEPTION

[75] Inventors: Charles W. Eichelberger, Schenectady; Philip M. Garratt, Amsterdam, both of N.Y.

[73] Assignee: General Electric Company, Schenectady, N.Y.

[22] Filed: Oct. 3, 1973

[21] Appl. No.: 403,224

[52] U.S. Cl. .................................................. 73/67.9
[51] Int. Cl. ................................................ G01n 29/04
[58] Field of Search ............... 73/67.7, 67.9, 67.5 R; 340/3 R, 5 H, 5 MP; 178/DIG. 18

[56] References Cited
UNITED STATES PATENTS
3,701,089  10/1972  Cowan ............................ 340/3 R OTHER PUBLICATIONS
Harrold; S. O. Solid State Ultrasonic Camera, Ultrasonics, April 1969, pp. 95-98.

Primary Examiner—Richard C. Queisser
Assistant Examiner—John P. Beauchamp
Attorney, Agent, or Firm—Donald R. Campbell; Joseph T. Cohen; Jerome C. Squillaro

[57]  ABSTRACT

In an improved acoustic image converter, a planar array of piezoelectric sensors each has an associated sense amplifier and multi-stage shift register for the sequential detection and storage of binary data representing the presence and absence of acoustic echoes at spaced time intervals. The multiple echoes are produced by reflection of a single incident acoustic pulse by heterogeneities at selected parallel planar regions within the object at varying depths. The individual shift registers are serially connected as one long shift register for readout. Multiple images resulting from each periodic acoustic pulse can be displayed coincidentally in real time, for example as a stereo visual display, to obtain depth perception.

19 Claims, 12 Drawing Figures

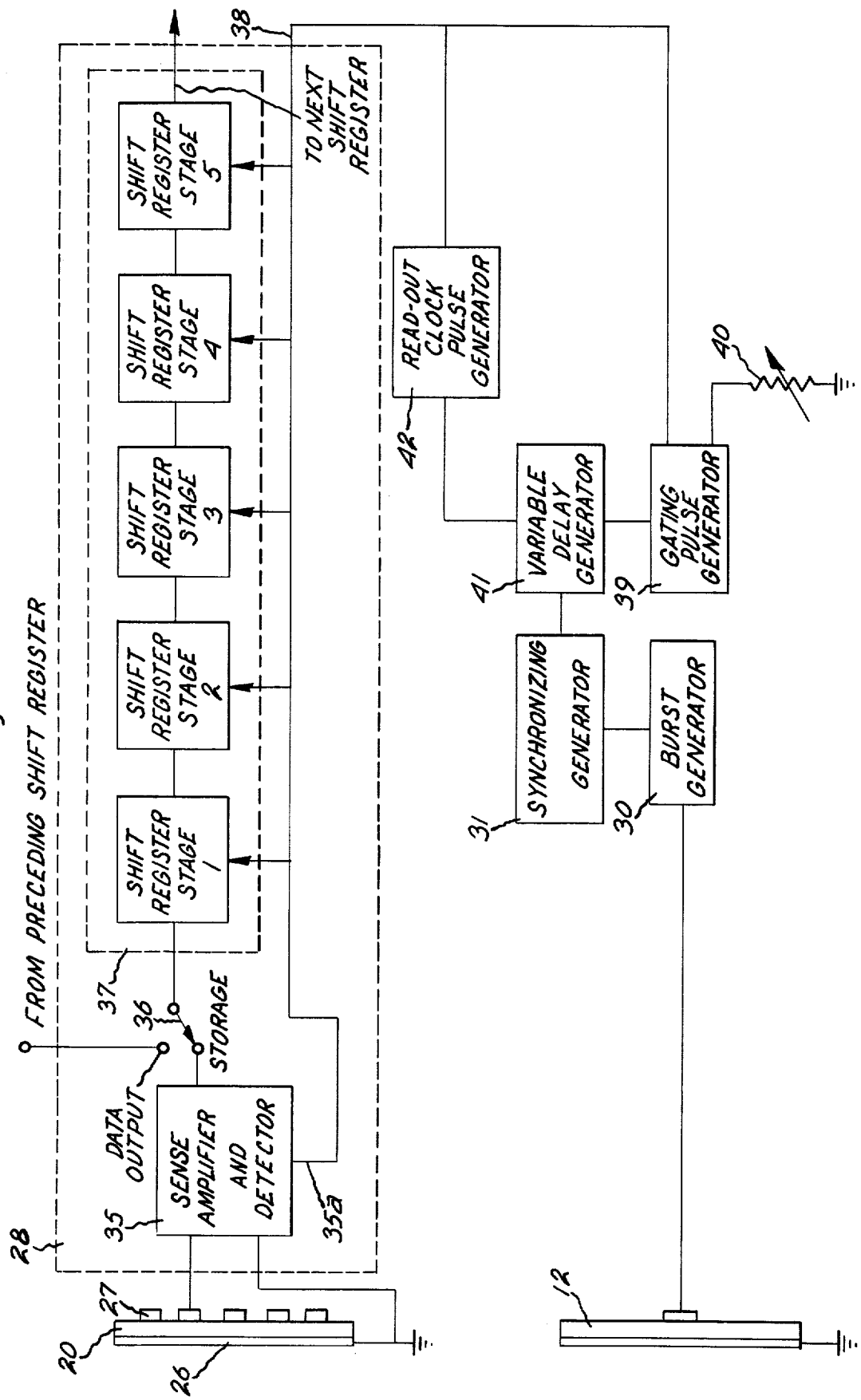

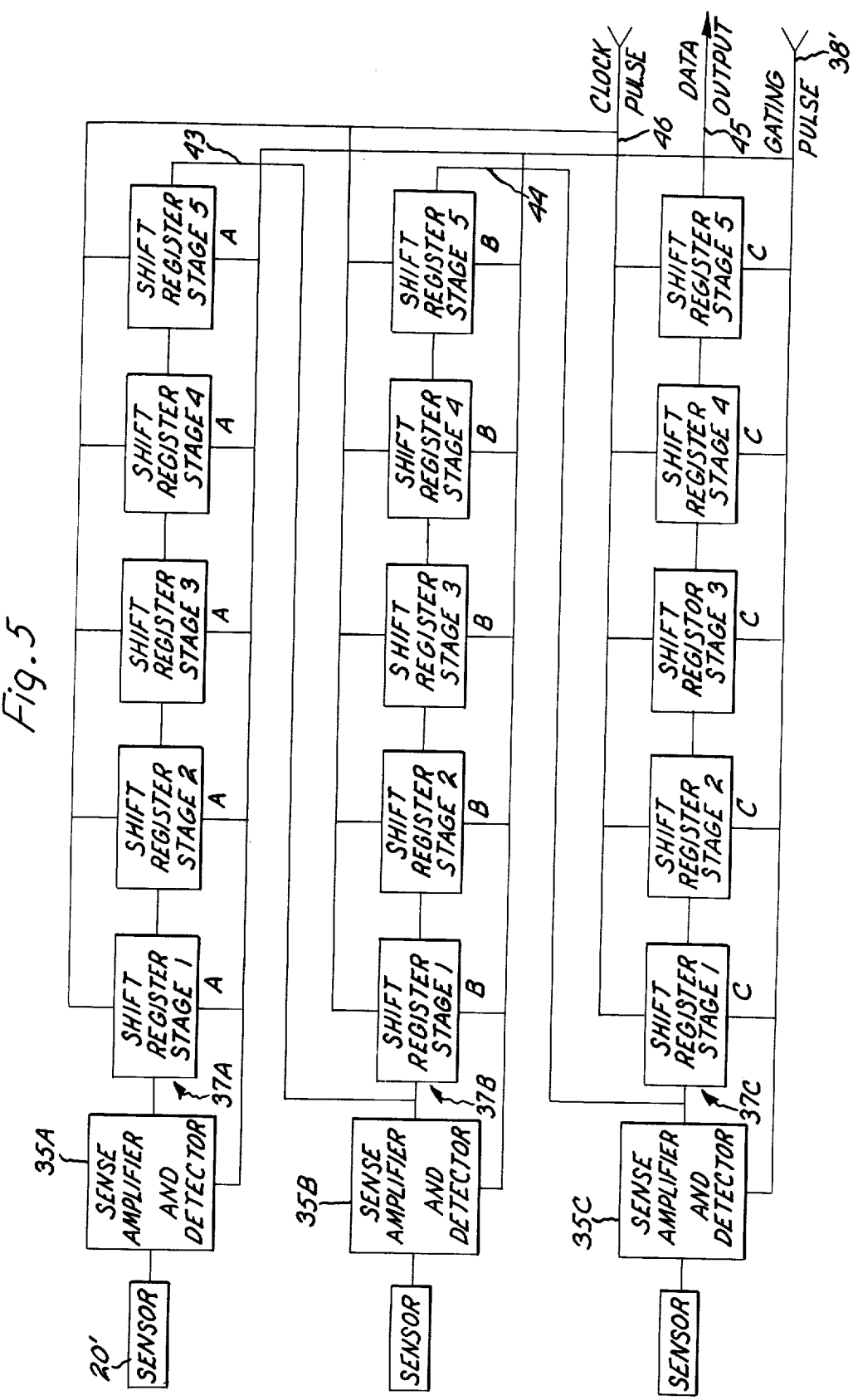

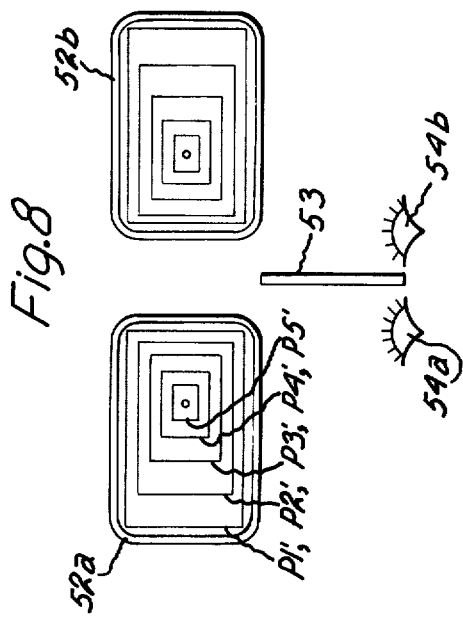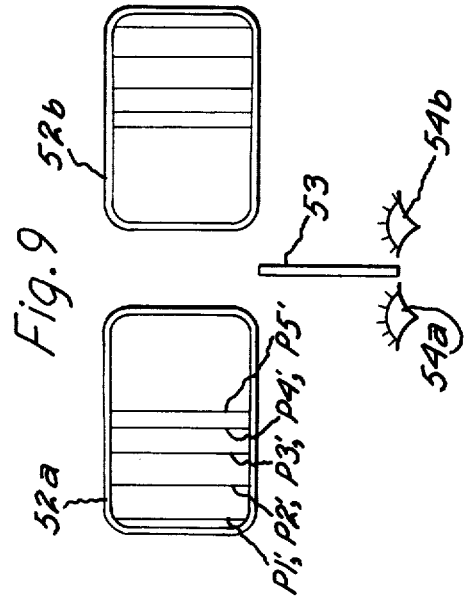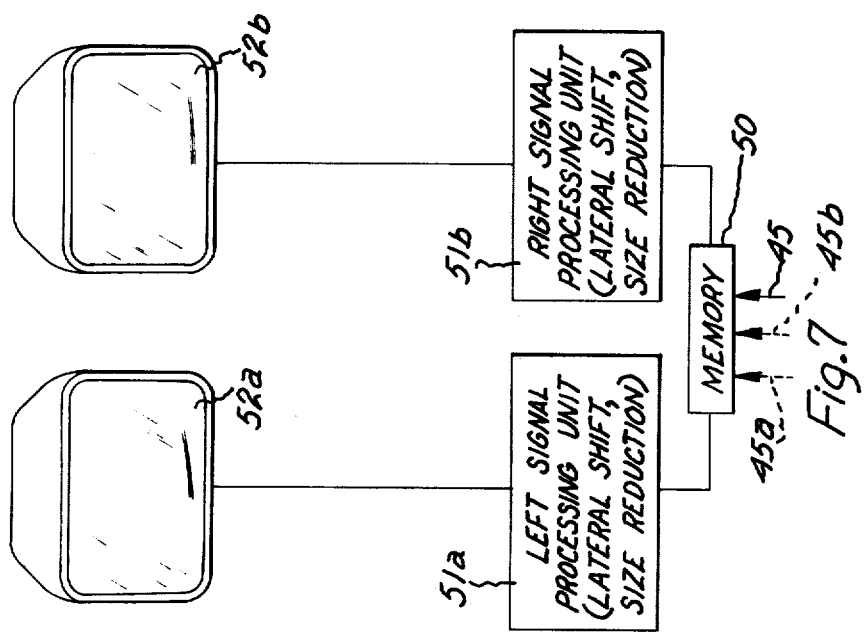

3,895,525

ACOUSTIC IMAGING APPARATUS FOR VISUAL DISPLAY WITH DEPTH PERCEPTION

BACKGROUND OF THE INVENTION

This invention relates to acoustic imaging apparatus for the visualization of interior and exterior features of objects in depth, more particularly by provision for the coincident display of images of multiple planar regions in the object at varying depths. Typical applications are the continuous visualization of internal biological organs such as the beating heart, and the ultrasonic inspection of parts and other objects for flaws.

The present invention is an improvement and extension upon the system for imaging a single planar object region disclosed in copending application Ser. No. 290,253, by Henry A. F. Rocha, filed on Sept. 18, 1972 and assigned to the same assignee, now U.S. Pat. No. 3,780,572 dated Dec. 25, 1973, which in turn is a continuation of abandoned application Ser. No. 156,226 filed on June 24, 1971. The Rocha system utilizes a transmitter for directing periodic acoustic pulses toward the object, and a planar acoustic image converter with sensors in rows and columns for converting the focused ultrasonic echo pulses into electrical signals. The outputs of the sensors are amplified and gated at a selected time interval following generation of the acoustic pulse corresponding to the depth within the object of the particular planar region to be imaged on a light emitting diode array or other visual display. For each incident acoustic energy pulse there is essentially only a single two-dimensional image. Although the depth of the imaged planar region can be changed, and the object can be scanned from front to rear by a scan rate control to provide a "composite view" or "pseudo three-dimensional view" of the internal structure, this is not a true display in depth.

Another recent development in the field of visual image conversion of ultrasonic echo signals is disclosed in copending application Ser. No. 285,910 by John M. Houston and Jack D. Kingsley, filed on Sept. 1, 1972 and assigned to the same assignee, now U.S. Pat. No. 3,778,756 dated Dec. 11, 1973. This equipment utilizes a single row of acoustic detectors which views a planar region extending depthwise through the object. That is, when both arrays of detectors are positioned directly in front of the object to be examined, Rocha's display is a planar slice parallel to the front of the body whereas the Houston-Kingsley display is a planar slice normal to the front of the body. The signals obtained can be viewed on a cathode ray tube in such manner that there is a continuous visualization in depth. The foregoing apparatus uses a single transmitter, whereas a concurrently filed application by John M. Houston, Ser. No. 285,913, now U.S. Pat. No. 3,778,757 dated Dec. 11, 1973, employs several transmitters oriented at different angles about the object.

SUMMARY OF THE INVENTION

In accordance with the invention, an improved acoustic image converter with a planar array of sensors is provided having, for each individual sensor of incident acoustic energy, a signal processing channel comprised by a sense amplifier and detector and an individual multi-stage shift register for the sequential storage of binary data representing the presence and absence of incident acoustic echoes at a series of spaced time intervals. The individual shift registers for all or a selected group of signal processing channels are further connectable in series for the reading out of stored binary data. During an input or read-in cycle, a train of gating pulses is supplied at the series of spaced time intervals in parallel to each sense amplifier and detector, to produce an output therefrom, and also to the stages of the individual shift registers to shift the binary data therethrough. During an output or read-out cycle, a train of clock pulses are supplied usually at a high repetition to the stages of the serially connected individual shift registers to output all the stored binary data at the last stage of the final shift register. Separate conductor networks can be provided for the gating and read-out pulses, or a common conductor network is possible when a switch is included in each signal processing channel. In either case the number of input and output lines is small, as is needed for integrated circuit fabrication of the circuits and the preferred use of a piezoelectric plate sensor for the array.

In an acoustic imaging system for visualizing in depth an object with internal acoustic heterogeneities, suitable means are provided for generating a series of acoustic pulses, typically with a period of about 10 milliseconds, that are directed toward the object being examined. Multiple echoes are produced by the reflection of a single incident acoustic pulse by heterogeneities at selected parallel planar regions within the object at varying depths. After focusing, the sequential echo signals are sensed by the acoustic image converter at coordinated time intervals and stored in binary form in the individual multi-stage shift register associated with each sensor or imaging site. Before the launching of the next acoustic pulse, the stored binary data, containing image data for a single planar object region in corresponding stages of the shift registers, is read out. Usually, a memory is provided for the storage of the serially read-out binary data. The preferred stereo visual display is a pair of cathode ray tubes viewed respectively with the left and right eyes. By laterally shifting the images in known fashion by means of a suitable signal processing unit, multiple images resulting from each periodic acoustic pulse can be displayed coincidentally in real time to obtain depth perception. The movement of an object in motion, such as a beating heart, can be visualized. Another large class of applications is ultrasonic inspection.

BRIEF DESCRIPTION OF THE DRAWINGS

FIG. 4 is a block diagram of a single signal processing channel associated with one sensor or imaging site with capability for storing and reading out sequentially sensed signals, and of the acoustic pulse generation circuitry;

FIG. 5 is a block diagram of several signal processing channels for a like number of sensors, illustrating the serial connection of the data storage individual shift registers for readout;

FIG. 7 is a schematic representation using block diagrams of the processing of the output data for stereo display on two simultaneously viewed cathode ray tubes; and FIGS. 8 and 9 illustrate two techniques for the relative displacement of images from multiple planes within the object so that the viewer perceives also the depth of the object.

DESCRIPTION OF THE PREFERRED EMBODIMENT

Figure 1:
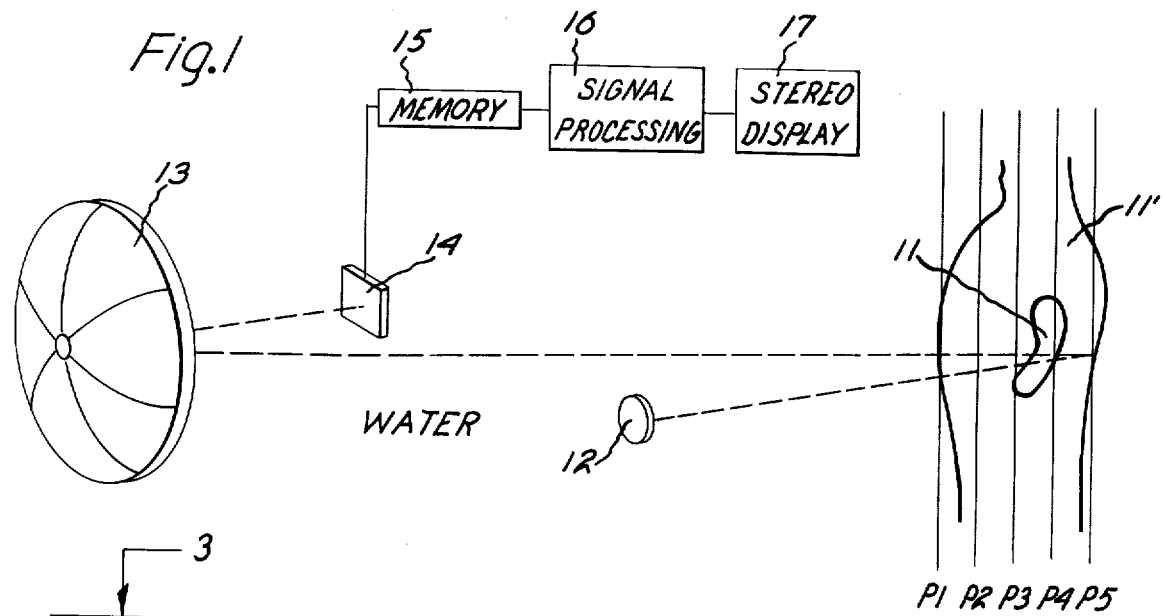
FIG. 1 is a diagrammatic perspective view of acoustic imaging apparatus as used according to the present invention to view the human heart, showing in block diagram form the processing of the output data for a stereo display with depth perception.

The acoustic imaging system shown schematically in FIG. 1 is capable of producing visual images such that it is possible to perceive depth within three-dimensional objects having acoustic heterogeneities. In an application which dramatically illustrates the structure and full range of operation of the acoustic imaging system, the preferred embodiment is explained with regard to the real time and continuous visualization of a beating human heart. This system employs a stereo display provided by a pair of cathode ray tubes, one viewed by the left eye and the other by the right eye. Although real time and continuous display similar to a television or motion picture is most commonly desired, the electrical output data from which the images are formed can be stored for delayed presentation or computer print-out. Another large class of applications is the ultrasonic inspection of metallic workpieces ad other parts for flaws, and while there is no internal movement within the inanimate objects, the viewing of a "three-dimensional" image is preferable to improve the interpretation of the image and increase the ability to locate and recognize flaws.

In FIG. 1, both the object and the entire acoustic imaging apparatus, with the exception of the circuitry for processing the electrical output data and the visual display devices, are immersed in a tank of water or other suitable liquid. As was mentioned, the object being imaged is the human heart 11 and possibly other portions of the body 11', depending upon how the apparatus is set up and operated and what it is desired to view. The external shape of the heart 11 can be imaged as well as other acoustic heterogeneities within the heart itself such as the valves, chamber walls, etc., depending again on such factors as what it is desired to examine, the resolution of the apparatus, an so on. By acoustic heterogeneity or discontinuity is meant a separation surface between two media having different acoustic impedances. In the use of the system, acoustical energy pulses are periodically generated by transmitting transducer 12 and directed toward objects 11 and 11'. The acoustical reflections from the front and back of body 11', the front and rear surfaces of heart 11, and other acoustic heterogeneities within the heart itself and within the body, are produced at varying times after the launch of the acoustic pulse depending upon the range or distance from the transmitter. The train of reflected acoustical echo pulses are focused by a suitable acoustic reflector 13 located at the end of the tank of water. The reflector 13 is preferably concave in shape such that images of the time-spaced acoustic reflections o echo signals are formed sequentially at its focal plane A planar acoustic image converter 14, composed of a $n^2$ array of acoustical transducers, converts the spatia distribution of the acoustical pressure waves inciden on one surface thereof into a corresponding array o electrical signals, each of which is sensed and stored i binary form in a multi-stage shift register.

As distinguished from the Rocha acoustic imagin apparatus described in the previously identified appli cation Ser. No. 290,253, to which the reader may refe for further information, the electrical output data de tected and stored in response to each incident acousti pulse is used to produce multiple images of planar re gions or planar slices at different depths within the ob ject. The acoustic pulses produced by transmittin transducer 12 typically have a period of 10 millisec onds to allow sufficient time between succeeding pulse for acoustic reverberations to subside within the tan containing the water and various components of the ap paratus. By way of example, five planar regions P1 t P5 are illustrated at different depths within body 11 and heart 11. By periodically gating or activating th amplifier-detectors associated with the array of sensoi in the acoustic image converter 14, all within the 1 milliseconds before the next acoustic pulse is launche( electrical output data for producing the images of th five selected planar regions P1 to P5 can be obtaine( These are stored in the multi-stage shift register whic then has at least five stages, and read out at a rapi clock pulse rate to provide data for forming the fiv two-dimensional images. The information is decode( separated, and displayed in such a way that the fiv planes corresponding to five different object deptl can be stored, sensed, and displayed within the sam time frame, i.e., the time between succeeding acoust cal pulses. In the preferred embodiment, the data is e1 tered into a memory 15, processed by a suitable sign: processing apparatus 16 to effect lateral shifting of th five image frames relative to one another and an o| tional reduction in size, and supplied to a stereo displa 17 in the form of a pair of cathode ray tubes. As wi be explained in detail later, data for the five images a1 fed to each cathode ray tube serially in rapid successic such that the images are integrated either at the screei or by the eyes and appear to be coincident with the ill sion of depth. Upon the generation and launching ‹ the next acoustical pulse, the entire process is repeate and concluded by a rapid readout of the data for stere visual presentation. When this is repeated for a numb‹ of expansions and contractions of the heart 11, assur ing that there are enough closely spaced planes, tl beating of the heart can be observed.

Figure 2:
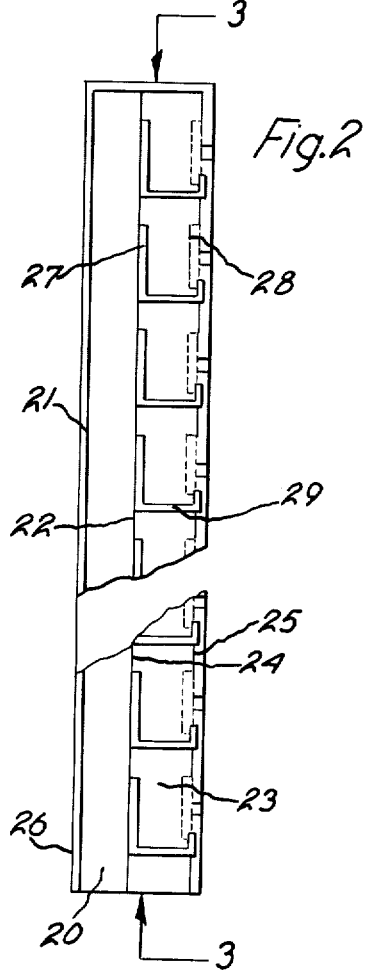
FIG. 2 is a side view of the acoustic image converter for converting the acoustic echo pulses to equivalent binary electrical output signals and storing these signals.
Figure 3:
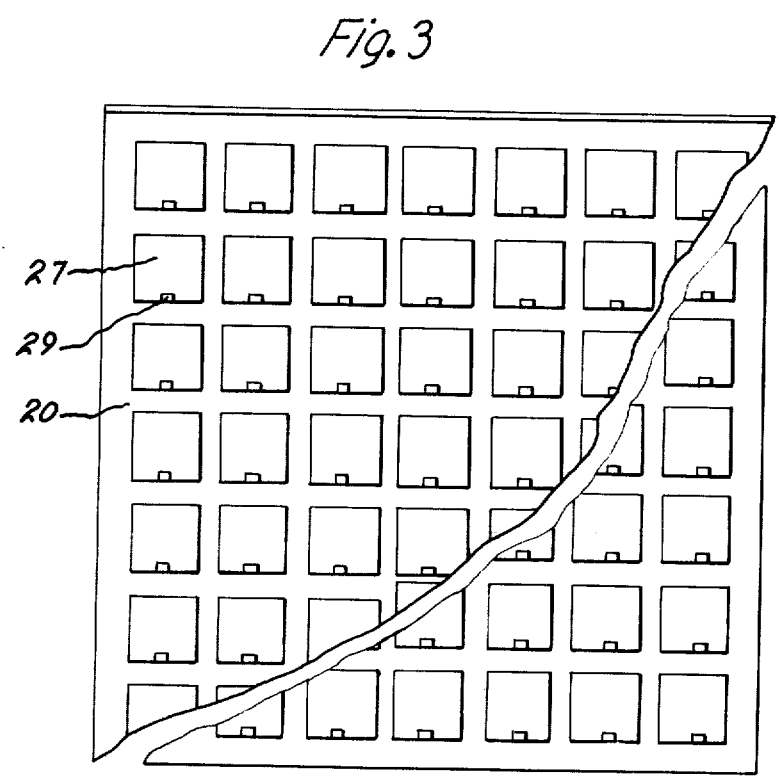
FIG. 3 is a plan view taken along line 3—3 of FIG. 2 showing the planar array of sensors.

FIGS. 2 and 3 show some of the structural details the acoustic image converter 14. This component i cludes a piezoelectric transducer plate 20 which co verts the acoustic pressure waves into electrical pote tial differences created between its opposed faces ; and 22. A semiconductor substrate memeber 23 is al: provided having a pair of opposed faces 24 and 25, tl first of which is disposed adjacent the face 22 of tl transducer plate, for providing point-by-point ampli cation, detection, and binary storage of the electric signals appearing on the piezoelectric transducer pla 20. This transducer plate is made of lead zirconat titanate or other suitable material and has a metall coating 26 on its outer face. The internal face 22 h a plurality of generally square metallic contacts 27 suitably bonded thereto. The individual contacts 27 are arranged in a plurality of columns and rows. Acoustic stresses applied to the outer surface of plate 20 in the form of a spatial distribution of reflected acoustic echoes produce voltages between the contacts 27 and the conductive coating 26 which vary with the applied acoustic stress. That is, the voltage distribution is a representation of the distribution of the acoustic pressure waves on the face of the piezoelectric plate 20. The semiconductor substrate member 23 has one face 24 suitably bonded to the adjacent face 22 of the piezoelectric plate 20 and includes in the region at or in the opposite face thereof a plurality of identical signal processing channels, one of which will be described in connection with FIG. 4, suitably formed by integrated circuit techniques well known in the art. The signal processing channels are indicated schematically by the dotted regions 28. Each metallic contact 27 is connected to its respective signal processing channel 28 by means of a conductor 29 extending through a hole in the semiconductor plate member 23. Suitable connections are made, for example as described in the aforementioned Rocha application, to effect the circuit connections as shown in FIGS. 4 and 5. In one appropriate arrangement, a subarray is comprised of a 10 × 10 matrix of piezoelectric sensors or imaging sites and associated individual signal processing channels, and a complete array is comprised of a 10 × 10 matrix of the subarrays, making a total of 10,000 sensors or imaging sites and associated circuitry.

The electronic circuit for producing a train of spaced electrical exciting signals for the transmitting transducer 12 is shown in FIG. 4 together with one of the signal processing channels 28 for detecting, storing, and reading out the data for a single piezoelectric sensor or imaging site. A burst generator or rf oscillator 30 generates short bursts of electrical waves usually at frequencies in the range from 500 kilohertz to 20 megahertz. The burst generator 30 in response to actuating pulses from a synchronizing generator 31 produces bursts of electrical energy which are applied to the transmitting transducer 12, which in turn converts the electrical energy into acoustic pressure waves that propagate through the liquid and are incident upon the object. The transmitting transducer 12 includes a piezoelectric plate made of a material such as lead zirconate-titanate, one face of which has a conductive coating connected to ground while the other face has a contact to which the electrical energization from the burst generator 30 is applied.

In the acoustic image converter 14, there is shown in block diagram form the basic components of an individual signal processing channel 28 associated with one of the sensors comprised by the piezoelectric plate 20 having the grounded metallic coating 26 on one face and a square metallic contact 27 on the other face. The sensor output signals are applied to a sense amplifier and detector 35 which is rendered conductive, or produces an output, only when a gating or strobe pulse is applied to its gating input terminal 35a. Output data representative of the sensed acoustical energy during these selected time intervals is fed through a two-position switch 36, whose purpose is explained later, to the first stage of a multistage shift register 37. The number of stages in the shift register 37 is at least as great as the number of planes to be imaged within a single time frame, namely, at least five stages for the example given in FIG. 1. Each of the identical, serially connected stages, identified as stage 1 to stage 5, is essentially a binary storage element. Although a variety of circuits and devices can be used to fabricate the shift register, the use of bipolar transistors in the current mode logic configuration is advantageous to obtain high speed with low power requirements. Alternatively, complementary metal-oxide-silicon (CMOS) circuits can be employed. In operation, data fed into the input of each individual stage is stored until the appearance of a clock pulse at the clock pulse input which serves to shift the stored data from one stage to the next succeeding stage. With the switch 36 in the storage position, the presence or absence of an acoustic echo signal at a particular time as determined by the timing of the gating pulses applied to sense amplifier and detector 35, is gated into the first stage of the shift register in the form of a ONE or ZERO. As the later gating pulses occur, previous information is shifted to the later stages of the shift register. The gating pulses for sense amplifier and detector 35 and the clock pulses for shift register 37 are supplied as a single pulse over the common line 38 so that the shifting of the information and reading into the first stage are coincident. Line 38 is connected to the output of a suitable gating pulse generator 39 having an adjustable control element 40 for adjusting the width of the gating pulse. The generation of the gating pulses is synchronized with the generation of the acoustic pulses either by direct connection to the synchronizing generator 31 or by connection through a variable delay generator 41.

In the improved acoustic image converter 14, the individual multi-stage registers 37 associated with each sensor element have the dual function of first providing binary storage for the sequentially received echo signal data, and second of providing a means for reading out the stored data in an orderly fashion. To achieve the second function, the individual multi-stage shift registers 37 have a connection between the last stage of one shift register and the first stage of the next shift register so as to effectively form one long shift register for the output of the stored information. This arrangement requires a small or minimum number of internal connections, and is consistent with fabrication of the signal processing channels 28 as monolithic or hybrid integrated circuits, as for example in sub-arrays of 100 sensors and associated signal processing channels. The sub-arrays can in turn be connected serially, or the information can be outputted in parallel from the various sub-arrays. In FIG. 4, the switch 36 is moved to the data output position to initiate the output cycle and effect serial connection of the individual shift registers. By applying a train of clock pulses to the common line 38, the stored binary data is shifted from one stage to the next, entered into the next serially connected shift register, and so on. Since clock pulse rates to 10 megahertz are possible, the read-out cycle can be very short. The gating pulse generator 39 can be used to generate the clock pulses, and alternatively a separate readout clock pulse generator 42 actuated by variable delay generator 41 can be provided. For the arrangement of FIG. 4 using the control switch 36, which can be a solid state switch, the multi-stage shift registers 37 for an entire sub-array module can be easily accessed by no more than two connections per module. These are the combined gating-clock line, and a data output line from the final stage of the last shift register.

The modification shown in FIG. 5, which is the preferred embodiment of the invention, uses a gating pulse conductor network for the input cycle, a separate clock pulse conductor network for the output cycle, and a data output line, making a total of three connections per module or sub-array. To illustrate the principle, a total of three echo signal sensors 20' and associated signal processing channels are shown. Each of the three individual multi-stage shift registers has a total of five stages, as in FIG. 4. The gating pulse line 38' is connected to the sense amplifier and detector 35A and to each of the stages of the associated shift register 37A, and in parallel to the same components of the B signal processing channel and the C signal processing channel. To effect serial connection of the individual shift registers, the line 43 connects the output of the last stage of the shift register 37A to the input of the first stage of the next shift register 37B, and line 44 in similar fashion connects these in series with the next shift register 37C. A data output line 45 is taken from the final stage, identified as stage 5, of shift register 37C. The separate clock pulse line 46 is connected to each of the individual stages in shift register 37A and in parallel to each of the stages in the other shift registers 37B and 37C. Thus, a single gating pulse during the input cycle actuates each of the shift registers for the reading in and shifting of binary data, and a single clock pulse during the output cycle simultaneously shifts the stored data from each shift register stage to the next succeeding stage.

Figure 6A:
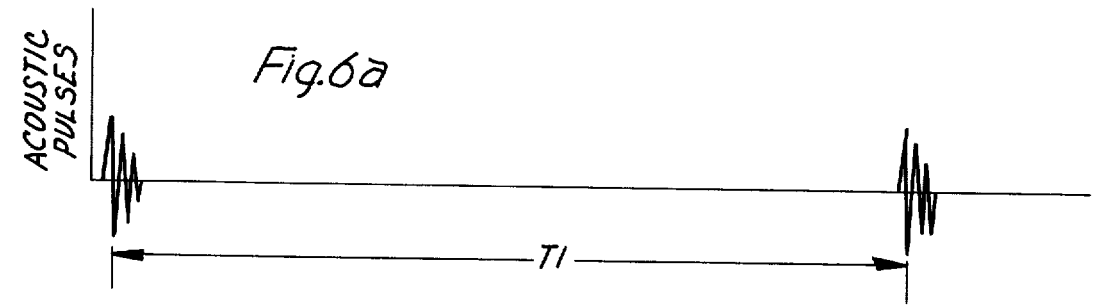
FIGS. 6a–6d are diagrams showing the relative timing, respectively, of the incident acoustic pulses, the sensor signals, the gating pulses for the signal processing channel, and the sense amplifier and detector output signals.
Figure 6B:
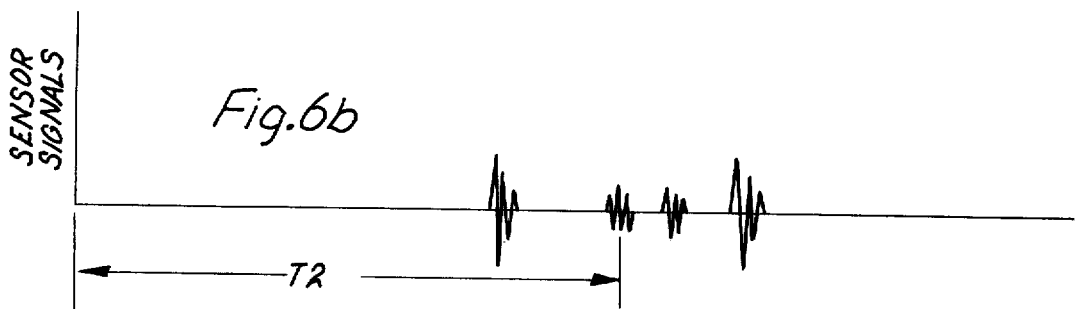

In view of the fairly complete discussion already given, only brief review of the operation will be given with reference to the timing diagrams of FIGS. 6a to 6d. In FIG. 4, synchronizing generator 31 produces trigger pulses typically having a period of 10 milliseconds. The train of trigger pulses applied to burst generator 30 produces an ultrasonic frequency energizing pulse for exciting the transmitting piezoelectric transducer 12. The resulting train of ultrasonic acoustic pulses, as shown in FIG. 6a, have a period T1 and are directed toward the heart 11 and body 11' to be imaged. The incident acoustical pulse is reflected at each acoustical heterogeneity within its path, thus producing a train of reflected acoustical echo signals that are focused by the acoustical reflector 13 and are incident on the acoustic image converter 14. In the piezoelectric sensor portion of the acoustic image converter, the matrix of sensors converts a spatial distribution of the acoustical echo pressure waves into a corresponding array of electrical potentials whose magnitude varies with the magnitude of the incident pressure wave. The piezoelectric sensor signals shown by way of example in FIG. 6b correspond, respectively, to the front surface of the chest, the front and rear of the heart, and the back surface of the chest. These are the reflections from the object planes P1, P3, P4, and P5 as shown in FIG. 1. It is noted that there is no echo signal from the plane P2. The time of arrival of the reflected echo signals at the acoustic image converter 14, measured from the launching of the acoustic pulse, is of course a known quantity depending upon the range from the transmitting transducer 12, and has the value T2 for the echo signal produced by the reflection from the front surface of the heart.

Figure 6C:
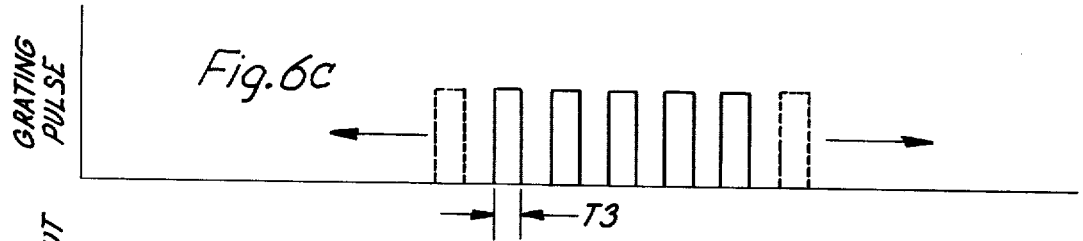
Figure 6D:
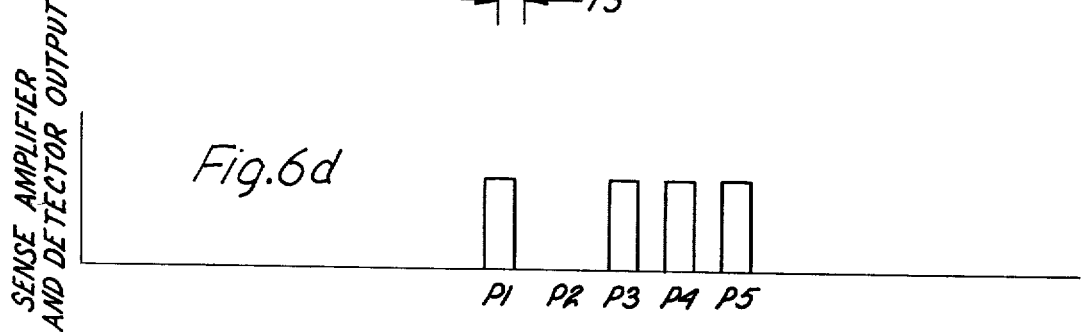

The trigger pulses produced by the synchronizing generator 31 are also supplied to the variable delay generator 41, which after the selected time interval following the launching of an acoustic pulse, energizes or enables the gating pulse generator 39. As shown in FIG. 6c, a train of gating pulses are generated having a variable width or time duration T3 and applied over the line 38' (FIG. 5) to each sense amplifier and detector 35 and to each stage of the associated shift register 37. The output of each sense amplifier and detector is a ONE or a ZERO, and for the particular example, the output is a ONE with the exception that there is a ZERO at the time corresponding to sensing of the information from the object plane P2. At each gating pulse signal, assuming that they are properly timed, sensed data from one object plane is entered into the first stage of each individual shift register, and then shifted to the next stage as data from the next object plane is sensed and entered and so on. At the end of the input cycle the last stage of each shift register contains the data for the object plane P1, and the other stages contain the data for the object planes P2 to P5. The output cycle in which the data is read out of the shift registers, which are effectively connected in series to make one long shift register, is initiated by the application of readout clock pulses to the line 46. This may be accomplished at a very fast readout rate, such as 1 megahertz. Thus, the data from all the shift registers is shifted serially through the interconnected individual shift registers to the data output line 45 connected to the last stage of the final shift register. The entire operation is repeated successively in response to the launching of each acoustic pulse.

To obtain a real time, continuous stereo visual display with depth perception, the multi-plane output data recorded in response to each acoustic pulse is suitably processed and displayed coincidentally to the viewer on a pair of cathode ray tubes, one of which is viewed with the left eye and the other with the right eye. To facilitate the decoding and separation of the multi-plane binary output data, the serially obtained data on the output data line 45 is read into a memory 50 (FIG. 7). Instead of a single serial input, each sub-array or module can have a separate output line 45a, 45b, etc., such that the output data from the various sub-arrays is read into the memory 50 in parallel rather than serially. In either case, the output data for the respective object planes P1 to P5 is fed simultaneously to a left signal processing unit 51a and a right signal processing unit 51b before being supplied respectively to the left and right cathode ray tubes 52a and 52b. In the processing unit 51a, the serial output data is processed to obtain a lateral shifting to the right of the sequentially produced images corresponding to the different depths in the object. Optionally, there can be processing to sequentially reduce the size of the images corresponding to the different depths in the object. In the right signal processing unit 51b, the data is processed to obtain a lateral shifting to the left of the successive image planes, with an optional size reduction of the successive images. This is further explained with regard to FIGS. 8 and 9.

In FIG. 8 is shown the screens of the two cathode ray tubes 52a and 52b, and also a septum 53 between them to permit separate viewing of the left tube 52a by the left eye 54a, and of the right tube 52b by the right eye 54b. On the left screen 52a, the respective images P1' to P5' are formed serially on the screen of the cathode ray tube, and appear to be coincident in the eyes of the viewer. As the depth within the object increases, the image planes P2' to P5' are successively shifted laterally to the right and successively reduced in size, in accordance with the known principles of perspective. At the screen of the right cathode ray tube 52b, the successive images P2' to P5' are shifted laterally to the left by the same amounts as at the left-hand screen, and are successively reduced in size by the same amounts. As is well known to those skilled in "three dimensional" display, the stereo image as seen by the eye is such that it is possible to perceive depth as well as width and height. In FIG. 9 the image planes are presented in the same manner with the exception that there is only a lateral shifting of the image planes to the right and left, respectively, without the size reduction of the image. The visual stereo display of FIG. 9 is suitable for many applications. In either type of stereo visual display, it is to be emphasized that the output data is binary data with the result that in each image plane a particular spot on the screen is either lit or not lit, that is, there is either a black dot or the absence of a dot. It is to be remembered, however, that there are as many as 10,000 imaging sites to obtain the data for each image plane. Further, the coincident display of the successive planes at varying depth in the object produces varying shades of gray as well as white and black. For further information as to the signal processing and display on a pair of cathode ray tubes, reference may be made for example to the article entitled "A Simple Multi-Dimensional C.R.T. Display Unit" by D. M. McKay, *Electronic Engineering*, Vol. 32, No. 388, June 1960, pp. 344–347.

Another type of appropriate cathode ray tube display to obtain the illusion of depth is to use a color-type cathode ray tube, in which the beam for the different colors are shifted laterally with respect to one another and each used to display one of the image planes. These color cathode ray tube displays can be used in pairs as previously described. In the event that the object being imaged is a moving object, such as the beating heart, the successively viewed sets of coincident images, changing at 10 millisecond periods for the example given, display the changing size of the beating heart as it goes through successive expansion and contraction cycles. As was previously mentioned, the continuous, real time visual display is not essential. The information can be read out of the memory 50 at some later time for a delayed presentation. Alternatively, the information can be printed out by a computer, and the individual image frames can be viewed separately or assembled together for stereo presentation with depth perception. These and other known types of visual display can be used with the improved acoustic image converter 14.

In summary, in an improved acoustic image converter with a planar array of piezoelectric sensors, there is provided a signal processing channel for each sensor comprising a sense amplifier and a multi-stage shift register for the sequential detection and storage of binary data representing the presence and absence of incident acoustic echoes at selected time intervals. The individual shift registers are serially connected for the subsequent readout of stored binary data, which corresponds to the spatial and time distribution of multiple echoes produced by reflection of a single acoustic pulse by heterogeneities at selected parallel planar regions at varying depths in the object. Multiple images resulting from each periodic acoustic pulse can be displayed coincidentally in real time to perceive depth within the object and motion of a moving object. Typical applications are the examination of internal biological organs and ultrasonic inspection of workpieces.

While the invention has been particularly shown and described with reference to a preferred embodiment and modification thereof, it will be understood by those skilled in the art that the foregoing and other changes in form and details may be made therein without departing from the spirit and scope of the invention.

What is claimed is:

1. An improved acoustic image converter comprising a planar array of sensors each of which converts incident acoustic pressure waves to a variable electrical signal,
   a plurality of signal processing channels each connected to a respective one of said sensors and each including a sense amplifier and detector for the electrical signal produced by the respective sensor, and further including an individual multi-stage shift register with a plurality of binary storage stages for sequentially storing as binary data the electrical signals above and below a predetermined level generated by sensing incident acoustic pressure waves at a series of spaced time intervals,
   means for serially connecting said individual shift registers for reading out stored binary data, and
   means for supplying a train of gating pulses at said series of spaced time intervals to each sense amplifier and detector, to produce an output therefrom, and to each individual shift register to shift the binary data therethrough, and for subsequently supplying a train of read-out clock pulses to each individual shift register.

2. An acoustic image converter according to claim 1 wherein said planar array of sensors is comprised by a piezoelectric plate having a conductive coating on one surface and a plurality of discrete contacts on the other surface each connected to one of said signal processing channels, said discrete contacts being arranged in rows and columns.

3. An acoustic image converter according to claim 1 wherein each signal processing channel further includes a switch to connect said individual shift register to said sense amplifier and detector for reading in the binary data and to alternately make connection to a preceding individual shift register for reading out the binary data, and
   said means for supplying a train of gating pulses and read-out clock pulses employs a common conductor network for both trains of pulses.

4. An acoustic image converter according to claim 3 wherein said plurality of signal processing channels have a single data output line at the last stage of the serially connected individual shift registers.

5. An acoustic image converter according to claim 1 wherein said means for supplying a train of gating pulses and read-out clock pulses includes separate conductor networks for each train of pulses.

6. An acoustic image converter according to claim 5 wherein said plurality of signal processing channels have a single data output line at the last stage of the serially connected individual shift registers.

7. Acoustic imaging apparatus for visualizing in depth an object with internal acoustic heterogeneities comprising
   means for generating a series of spaced acoustic pulses that are directed toward the object being examined,
   focusing means for focusing a train of reflected acoustic echo signals produced by multiple reflection of each acoustic pulse by heterogeneities at multiple parallel planar regions at different depths within the object,
   acoustic image converter means comprising a planar array of sensors each of which converts the focused acoustic echo signals to a variable electrical signal, a plurality of signal processing channels each connected to one of said sensors including a sense amplifier and detector for the electrical signal is produced by the respective sensor, and further including an individual multi-stage shift register with a plurality of binary storage stages for sequentially storing as binary data the electrical signals resulting from the sensing of the presence and absence of reflected echo signals from the parallel planar object regions, and means for serially connecting said individual shift registers for reading out the stored binary data,
   means for supplying trains of pulses in parallel to selected components of said signal processing channels to effect sequential read-in and shifting of said binary data, and to effect read-out of said stored binary data before the launching of the next acoustic pulse, and
   a memory for storage of the binary data read out of said serially connected individual shift registers.

8. Acoustic imaging apparatus according to claim 7 wherein said planar array of sensors is comprised by a piezoelectric plate having a conductive coating on one surface and a plurality of discrete contacts on the other surface each connected to one of said signal processing channels, said discrete contacts being arranged in rows and columns.

9. Acoustic imaging apparatus according to claim 7 wherein each signal processing channel includes a switch to connect said individual shift register to said sense amplifier and detector for reading in the binary data and to alternately make connection to a preceding individual shift register for reading out the stored binary data, and
   said means for supplying trains of pulses employs a common conductor network for both reading in and reading out.

10. Acoustic imaging apparatus according to claim 9 wherein said plurality of signal processing channels have a single data output line at the last stage of the serially connected individual shift registers.

11. Acoustic imaging apparatus according to claim 7 wherein said means for supplying trains of pulses includes a conductor network for gating pulses making connection to each sense amplifier and detector and each stage of each individual shift register to effect sequential read-in and shifting of binary data, and further includes a separate conductor network for read-out clock pulses making connection to each stage of each individual shift register to effect reading out of the stored binary data.

12. Acoustic imaging apparatus according to claim 11 wherein said plurality of signal processing channels have a single data output line at the last stage of the serially connected individual shift registers.

13. Acoustic imaging apparatus according to claim 7 further including stereo display devices for concurrently displaying substantially in real time multiple images of the multiple parallel planar regions at different depths within the object.

14. Acoustic imaging apparatus for visualizing in depth an object with internal acoustic heterogeneities comprising
   means for periodically generating a series of acoustic pulses that are directed toward the object being examined,
   focusing means for focusing a train of reflected acoustic echo signals produced by reflection of each acoustic pulse by heterogeneities at multiple parallel planar regions at different depths within the object,
   acoustic image converter means comprising a planar array of sensors each of which converts the focused acoustic echo signals to a variable electrical signal, a plurality of signal processing channels each connected to a respective one of said sensors including a sense amplifier and detector for the electrical signal produced by the respective sensor, and further including an individual multistage shift register with a plurality of binary storage stages for sequentially storing as binary data the electrical signals above and below a predetermined level produced by the sensing at a series of spaced time intervals of the electrical signals generated by the multiple acoustic echo signals resulting from the reflection of a single acoustic pulse, and means for serially connecting the individual multi-stage shift registers for reading out the stored binary data from all of said signal processing channels,
   means for supplying a train of gating pulses at said series of spaced time intervals to each sense amplifier and detector, to produce an output therefrom, and also to each individual shift register to shift the binary data therethrough, and means for subsequently supplying a train of read-out clock pulses to each individual shift register before the launching of the next acoustic pulse, and
   visual display means for displaying the output binary data as multiple images of the multiple planar regions within the object at different depths.

15. Acoustic imaging apparatus according to claim 14 wherein said planar array of sensors is comprised by a piezoelectric plate having a conductive coating on one surface and a matrix of discrete contacts on the other surface each connected to one of sais signal processing channels.

16. Acoustic imaging apparatus according to claim 15 wherein said means for supplying a train of gating pulses and said means for supplying a train of read-out clock pulses employ separate conductor networks for each train of pulses.

17. Acoustic imaging apparatus according to claim 16 wherein said plurality of signal processing channels have a single data output line at the last stage of the serially connected individual shift registers for transmitting the output binary data to said visual display means.

18. Acoustic imaging apparatus according to claim 14 wherein said visual display means is comprised by a pair of cathode ray tubes, one viewed with the left eye and one with the right eye, and means for processing said output binary data so that said multiple images are produced on said cathode ray tubes coincidently with respect to the eyes to thereby provide a stereo display with depth perception.

19. Acoustic imaging apparatus according to claim 14 wherein said visual display means is operative substantially in real time to display each group of multiple images generated in response to the launching of said series of acoustic pulses.

* * * * *